United States Patent [19]

Hirata

[11] Patent Number: 4,902,949
[45] Date of Patent: Feb. 20, 1990

[54] MOTOR SERVO CIRCUIT

[75] Inventor: Masafumi Hirata, Kawaguchi, Japan

[73] Assignee: Fuji Photo Film Co., Ltd., Kanagawa, Japan

[21] Appl. No.: 209,949

[22] Filed: Jun. 22, 1988

[30] Foreign Application Priority Data

Jun. 23, 1987 [JP] Japan .................... 62-154365

[51] Int. Cl.⁴ .................................. G05B 1/02
[52] U.S. Cl. ..................... 318/608; 388/812
[58] Field of Search ............ 318/608, 314, 318

[56] References Cited

U.S. PATENT DOCUMENTS

| 4,567,409 | 1/1986 | Ogawa | 318/327 |
| 4,605,884 | 8/1986 | Miyagi | 318/314 |
| 4,639,649 | 1/1987 | Seto | 318/314 |
| 4,695,778 | 9/1987 | Chito et al. | 318/314 |

OTHER PUBLICATIONS

Reference Data for Radio Engineers, Federal Telephone and Radio Corporation 1952, F. J. Mann, editor, p. 81.

Primary Examiner—William M. Shoop, Jr.
Assistant Examiner—Saul M. Bergmann
Attorney, Agent, or Firm—Birch, Stewart, Kolasch & Birch

[57] ABSTRACT

A resistor is provided in parallel with the capacitor of a phase compensating circuit in order that a rapid transition may be made to a steady velocity state when a motor is started, a target velocity (reference velocity) is changed, or a large fluctuation in load occurs. When the steady velocity state does not prevail, the capacitor is isolated from the circuit and the resistor is connected into the circuit in its place.

5 Claims, 5 Drawing Sheets

MOTOR SERVO CIRCUIT

BACKGROUND OF THE INVENTION

1. Field of the Invention

This invention relates to a motor servo circuit for subjecting a motor to feedback control so as to hold the rotational velocity of the motor constant, and for controlling the rotational phase of the motor when required.

2. Description of the Prior Art

A motor servo circuit has been known which exercises feedback control in such a manner that the rotational velocity of a motor will be held constant and includes a rotational velocity sensor for sensing the rotational velocity of the motor, a velocity error sensing circuit for sensing a rotational velocity error by comparing the sensed rotational speed with a given reference velocity, and a phase compensating circuit which includes a capacitor, for controlling a motor driver circuit based on the velocity error signal inputted thereto. In order to control rotational phase, the motor servo circuit was also provided with a rotational phase sensor for sensing the rotational phase of the motor, a rotational phase error sensing circuit for comparing the sensed rotational phase with a prescribed reference phase to sense the difference between the two, and arithmetic means for adding the sensed rotational phase difference and the rotational velocity error (or for subtracting one from the other) and applying the result to the phase compensating circuit.

In a conventional motor servo circuit of this type, the rotational velocity error became large in magnitude and a large signal was applied to the phase compensating circuit when the motor was started or when the reference velocity changed. As a result, the capacitor in the compensating circuit becomes charged and it was impossible for the servo circuit to exercise control until this DC charge is discharged. Consequently, considerable time was required for the motor to attain a steady velocity, namely a servo-locked state.

In order to solve this problem, there has been proposed a motor servo circuit [Japanese Patent Application Laid-Open (KOKAI) No. 61-129772] provided with a circuit for sensing whether the servo-locked state has been attained, with the capacitor being short-circuited by a diode when the locked state was not attained. With this circuit, the capacitor was discharged through the diode so that the time required to attain the servo-locked state is shortened.

However, since the capacitor is short-circuited by the diode, the open-loop gain of the servo system declines and certain problems result. Specifically, the circuit could not deal with large fluctuations in load, the motor failed to start when starting was attempted, and a very long period of time was required to attain a steady velocity.

SUMMARY OF THE INVENTION

An object of the invention is to provide a motor servo circuit capable of rapidly bringing the rotational velocity of a motor to a steady velocity by exhibiting quick response when the motor is started, or when the reference velocity changes, etc.

According to the present invention, the foregoing object is attained by providing a motor servo circuit having a rotational velocity sensor for sensing the rotational velocity of the motor, a velocity error sensing circuit for sensing a rotational velocity error by comparing the sensed rotational velocity with a given reference velocity, and a phase compensating circuit, which includes a capacitor, for controlling a motor driver circuit based on the velocity error signal inputted thereto, the motor servo circuit comprising steady velocity sensing means for sensing a steady velocity state in which the sensed rotational velocity is in the vicinity of the reference velocity, a resistance circuit connected in parallel with the capacitor, and changeover means for changing over between the capacitor and the resistance circuit in such a manner that the capacitor is connected to the phase compensating circuit when the steady velocity state prevails as sensed by the steady velocity sensing means, and the resistance circuit is connected to the phase compensating circuit at all other times.

In accordance with the invention, when the rotational velocity of the motor varies from steady state, as when the motor is started, when the reference velocity changes or when there is a large fluctuation in load, the capacitor is isolated from the phase compensating circuit and the resistance circuit is connected to the phase compensating circuit in its place. As a result, on the one hand, the problem of capacitor charging does not arise, so that a failure will not develop in servo control; on the other hand, there is no decline in the open loop gain of the servo system, so that a rapid transistion can be made to the steady velocity state. Furthermore, since charging of the capacitor does not take place, there is less overshoot caused when the steady velocity state is attained. Moreover, since the capacitor is connected to the phase compensating circuit when the steady velocity state is attained, low-frequency compensation comes into play so that an increase in drift and load fluctuation can be prevented, thereby making stable servo control possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4b, 5b and 6b are closed-loop gain diagrams, in which FIGS. 4a, 4b illustrate the conditions which prevail in the steady velocity state, and FIGS. 5a, 5b illustrate the conditions which prevail in states other than the steady velocity state, as when the motor is started, and FIGS. 6a, 6b illustrate examples of the prior art;

DESCRIPTION OF THE PREFERRED EMBODIMENT

In the present embodiment, the present invention is applied to an electronic still video camera for recording a still video signal, resulting from photography performed by the camera, on a rotating magnetic disc or other type of magnetic recording apparatus, and to a playback apparatus for playing back a still video signal from a magnetic disc.

Figure 1:
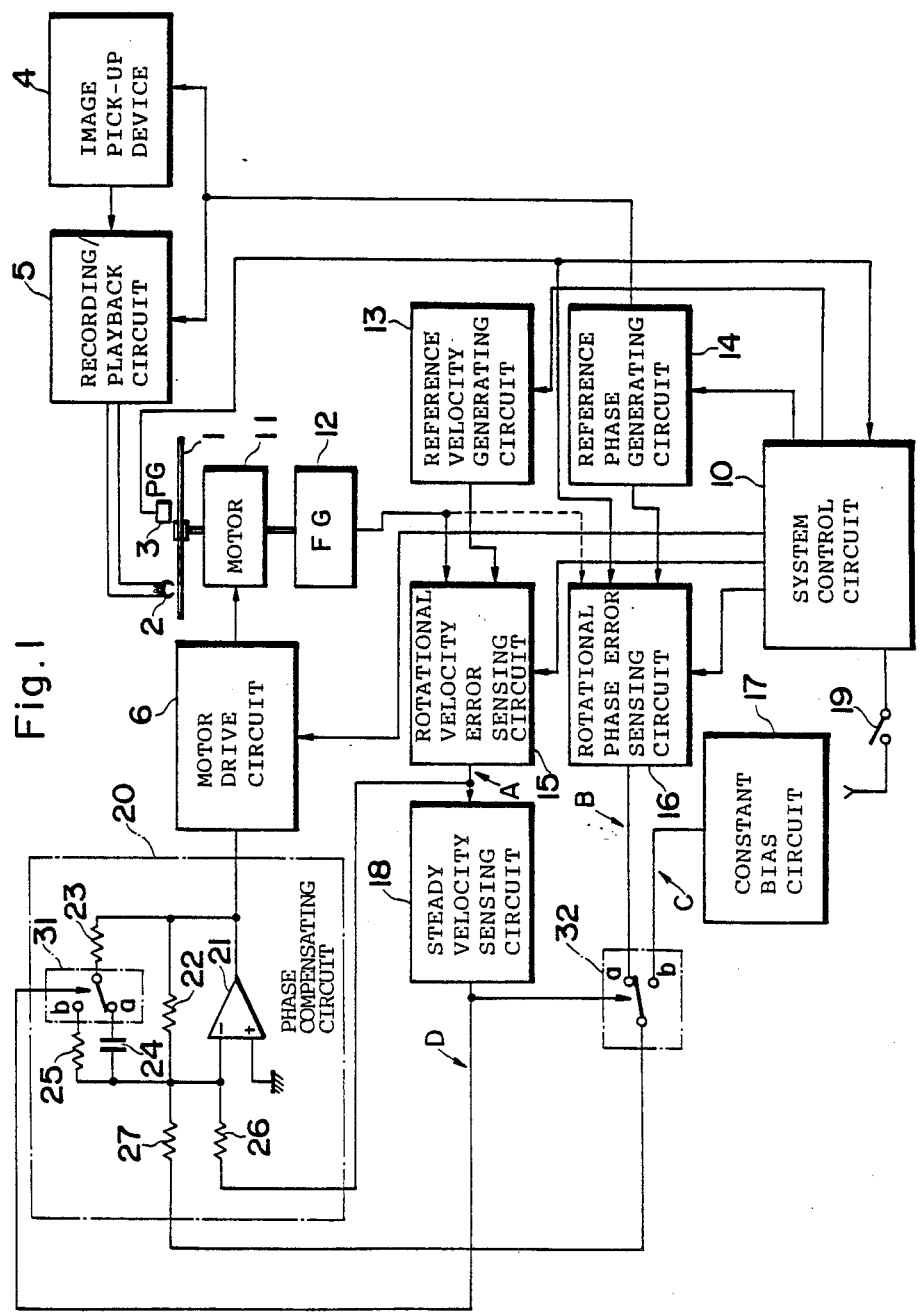
FIG. 1 is a block diagram of a motor servo circuit embodying the present invention.

With reference to FIG. 1, a magnetic disc 1 is mounted on the spindle of a motor 11 and is rotated by the motor 11. The motor 11 is rotatively driven by a driver circuit 6. A still video signal representing a subject imaged by an image pick-up device 4 is subjected to predetermined processing by a recording/playback circuit 5 and then is recorded by a magnetic head 2 on a prescribed track of the magnetic disc 1. Depending upon the particular case, a still video signal is played back from a prescribed track of the magnetic disc 1 by the magnetic head 2, and the resulting still video signal is subjected to predetermined processing by the circuit 5 and then delivered as an output from an output terminal (not shown).

Control of this recording/playback processing applied to the video signal is performed by a system control circuit 10. In terms of circuits particularly related to the illustrated embodiment, the system control circuit 10 controls the motor driver circuit 6, as well as a reference velocity generating circuit 13 reference phase generating circuit 14, rotational velocity error sensing circuit 15 and rotational phase error sensing circuit 16, which will be described below. An input signal from a switch 19 for commanding the start of rotation of motor 11 is applied to the control circuit 10.

The reference velocity generating circuit 13 generates a signal (e.g. a signal having a constant frequency) representing a target rotational velocity. This reference rotational velocity signal is applied to the rotational velocity error sensing circuit 15. The rotational velocity of the motor 11 is measured by a frequency generator 12. This circuit produces a signal representing the measured rotational velocity (i.e a signal having a frequency proportional to the rotational velocity), which is also inputted to the rotational velocity error sensing circuit 15. The rotational velocity error sensing circuit 15 senses the difference between the inputted reference rotational velocity and measured rotational velocity and outputs a signal (e.g. a voltage signal) A indicative of this rotational velocity differential. This rotational velocity error signal is inputted to a phase compensating circuit 20 via a resistor 26, and to a steady velocity sensing circuit 18.

The reference phase generating circuit 14 generates vertical and horizontal synchronizing signals and the like, applies these signals to the image pick-up device 4 and recording/playback apparatus 5, generates a signal (e.g. a single pulse per revolution of the motor at the reference rotational velocity thereof) representing a reference phase synchronized to these synchronizing signals, and applies this signal to the rotational phase error sensing circuit 16. Phase pulses PG representing rotational phase and outputted at a rate of one pulse per revolution of the magnetic disc 1 are generated by the phase generator 3 and inputted to the rotational phase error sensing circuit 16. The latter outputs a signal (e.g. a voltage signal) B representing the difference between the inputted reference phase and sensed phase. This phase error signal B is applied to one input terminal a of a changeover switch 32. The changeover switch 32 has another input terminal b, to which is applied a signal C representing a constant phase error (inclusive of a phase error of zero) outputted by a fixed bias circuit 17. The signal B or the signal C is inputted to the phase compensating circuit 20 through a resistor 27 depending upon whether the connection is to terminal a or b in the changeover switch 32. The rotational velocity error signal A inputted to the phase compensating circuit 20 through the resistor 26, and the phase error signal B or fixed phase signal C inputted to the phase compensating circuit 20 through the resistor 27 are added (or subtracted) through these resistors 26, 27.

In a case where one frame of a still video signal is extraced from a moving video signal introduced from a television system or the like and the still video signal is written on the magnetic disc 1, external synchronization is required. In such case, a vertical synchronizing signal is extracted from the externally applied video signal and this vertical synchronizing signal is used to form a reference phase signal. By using a changeover switch (not shown), this externally synchronized reference phase signal is applied to the rotational phase error sensing circuit 16 instead of the output reference phase signal of the reference phase generating circuit 14.

The phase compensating circuit 20 includes an operational amplifier 21 to which a feedback circuit is connected. The feedback circuit comprises a resistor 22 and a time constant changeover circuit connected in parallel with the resistor 22. The time constant changeover circuit includes a capacitor 24 and a resistor 25 connected in parallel with each other, a changeover switch 31 for selecting either the capacitor 24 or the resistor 25 in order to change over the time constant, and a resistor 23 connected to the changeover switch 31. The capacitor 24 is connected to the a side of the changeover switch 31, and the resistor 25 is connected to the b side of the switch 31. The output signal of the phase compensating circuit 20 is applied to the motor driver circuit 6, whereby the motor 11 is controlled so as to rotate at the reference rotational velocity and at the reference rotational phase.

The changeover switches 31 and 32 are controlled by an output signal D from the steady velocity sensing circuit 18. The latter senses, based on the rotational velocity error signal A, whether the rotational velocity error lies within a fixed range. The signal D attains an H level if the rotational velocity error is within the fixed range (the steady velocity state) and an L level if the error is outside the fixed range.

Figure 2:
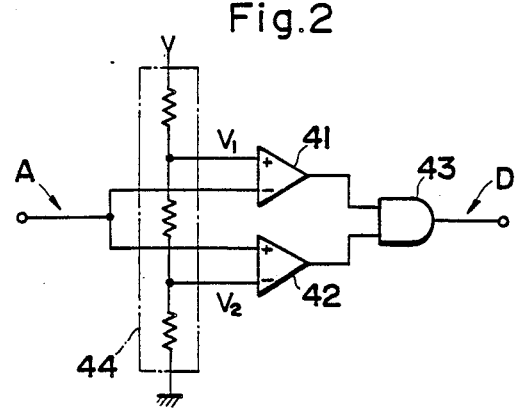
FIG. 2 is a circuit diagram illustrating a specific example of a steady velocity sensing circuit.

A specific example of the steady velocity sensing circuit 18 is illustrated in FIG. 2. The steady velocity sensing circuit 18 includes a reference voltage generating circuit 44 for generating two different reference voltages $V_1$, $V_2$, and two differential amplifiers 41, 42. The reference voltage $V_1$, which has the higher level, is applied to a positive input terminal of the differential amplifier 41, and the reference voltage $V_2$, which has the lower level, is applied to the negative input terminal of the differential amplifier 42. The rotational velocity error signal A is applied to the other input terminal of each of the differential amplifiers 41, 42. The output sides of the differential amplifiers 41, 42 are connected to an AND circuit 43. Accordingly, when the level of the inputted rotational velocity error signal A is between the reference voltages $V_1$, $V_2$, the signal D (the output of AND circuit 43) indicative of the steady velocity state attains the H level.

Figure 3:
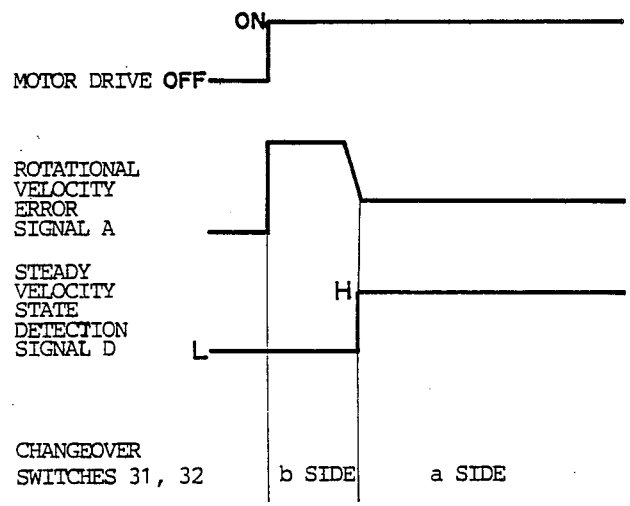
FIG. 3 is a time chart illustrating the operation of the circuit shown in FIG. 1.

The operation of the motor servo circuit shown in FIG. 1 will now be described with reference to FIG. 3.

When the switch 19 is turned on, the signal that results is inputted to the system control circuit 10, whereby the circuits 6, 13, 14, 15 and 16 begin performing the prescribed operations described above.

Since the motor 11 initially is at rest, the rotational velocity error respresented by the signal A is very large and the output signal D of the steady velocity sensing circuit 18 is at the L level. As a result, the changeover switch 31 is connected to the b side, so that the resistor 25 is connected to the abovementioned feedback circuit. Accordingly, the phase compensating circuit 20 does not have a pole in the low-frequency region. Since the rotational velocity error signal A possesses a large value and is applied to the motor driver circuit 6 via the phase compensating circuit 20, the motor 11 is started. Further, the changeover switch 32 is connected to the b side so that the constant phase signal C is applied to phase compensating circuit 20.

When the rotational velocity of the motor 11 eventually rises, the level of the rotational velocity error signal A falls and the rotational velocity approaches the steady rotational velocity, the output signal D of the steady velocity sensing circuit 18 attains the H level. When this occurs, the changeover switch 31 is changed over to the a side to connect the capacitor 24 into the circuit, whereby the low-frequency compensating action of the phase compensating circuit 20 comes into play. The changeover switch 32 is also changed over to the a side, so that the rotational phase error signal B is applied to the phase compensating circuit 20. Thus, rotational phase control is also carried out.

If the capacitor 24 were connected into the circuit from the start without providing the resistor 25 and changeover switch 31, the capacitor 24 would be charged to a DC charge when the rotational velocity error signal A attains the high level, as a result of which the rotational velocity of the motor 11 would exceed the reference velocity. Thus, so-called overshoot would occur.

In the embodiment of FIG. 1, however, the changeover switch 31 is connected to the b side, thereby connecting the resistor 25 into the circuit instead of the capacitor 24, until the rotational velocity of the motor 11 attains the steady velocity range. As a result, the capacitor 24 is not charged to a DC charge and there is no phase lag due to low-frequency compensation. This makes it possible to construct an overshoot-free, quick-response servo system.

Since the capacitor 24 performs low-frequency compensation after the changeover switch 31 is changed over to the a side, the load-resisting characteristic of the phase control of the present system with respect to a fluctuation in load is excellent.

Furthermore, since the phase compensating circuit 20 is not provided with the rotational phase error signal B but is fixed biased (i.e. is provided with the constant phase signal C) until the rotational velocity attains the steady velocity range, rotational control of the motor 11 at start-up is not influenced by the phase error output and phase locking can be rapidly achieved.

Figure 4B:
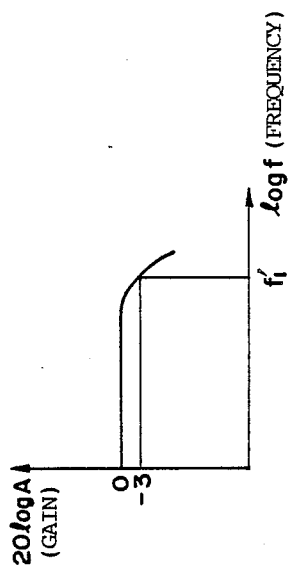
Figure 5B:
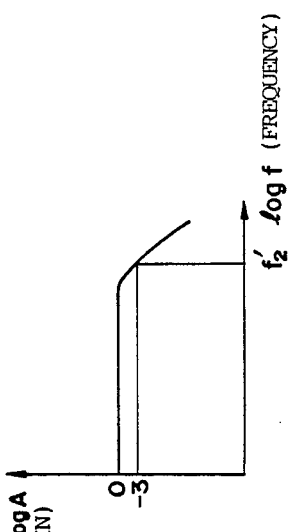
Figure 4A:
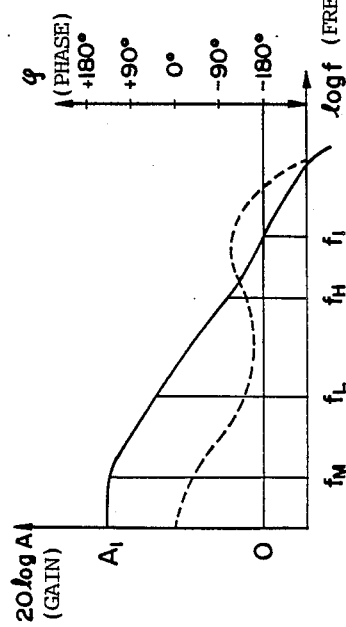
FIGS. 4a, 5a and 6a are open-loop Bode diagrams
Figure 5A:
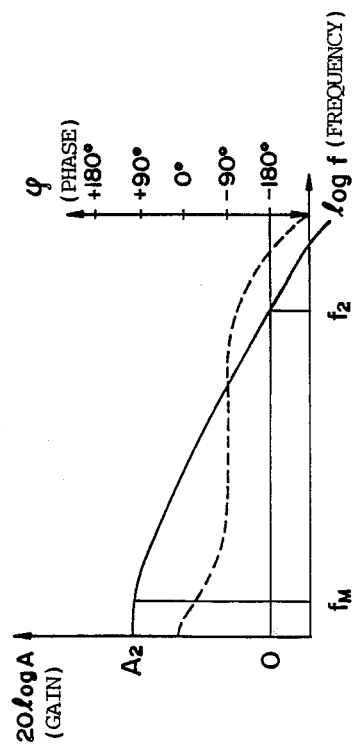
Figure 6B:
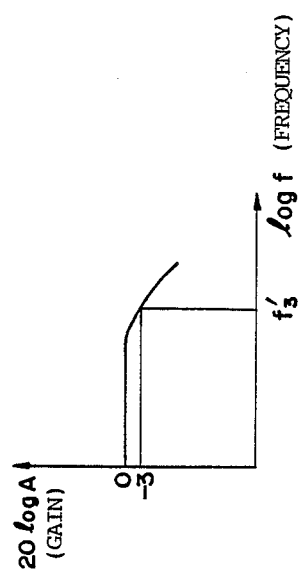

FIGS. 4a through 6b are gain diagrams and phase diagrams of transfer function in a velocity control system. FIGS. 4a, 5a and 6a are open-loop Bode diagrams (gain diagrams and phase diagrams) and FIGS. 4b, 5b and 6b are closed-loop gain diagrams. The solid lines indicate gain and the broken lines indicate phase.

FIGS. 4a, 4b are characteristics which prevail when motor rotational velocity lies within a steady velocity range, namely when the changeover switch 31 in FIG. 1 is connected to the a side (equivalent to a case in which the resistor 25 and changeover switch 31 are not provided). In FIGS. 4a, 4b, $f_M$ represents the pole of the motor, $f_L$ a first pole of the phase compensating circuit, $f_H$ the zero point of the phase compensating circuit, $f_1$ the 0 dB crosslinking frequency, $A_1$ the DC gain, and $f_1'$ the $-3$ dB bandwidth for the closed loop.

FIGS. 5a, 5b are characteristics which prevail at times other than when the steady state is in effect, namely when the changeover switch 31 in FIG. 1 is connected to the b side. In FIGS. 5a, 5b, $f_2$ represents the 0 dB crosslinking frequency, $A_2$ the DC gain, and $f_2'$ the $-3$ dB bandwidth for the closed loop.

Figure 6A:
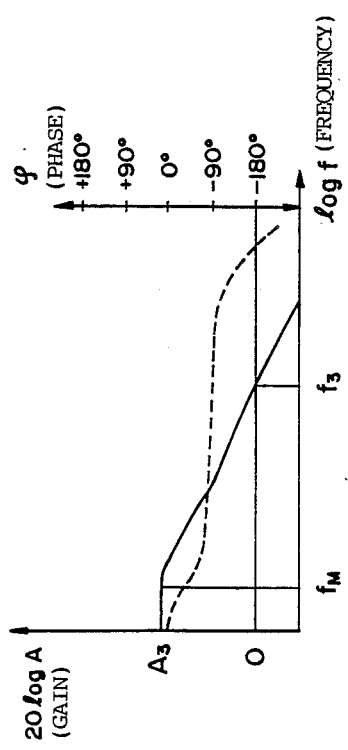

FIGS. 6a, 6b are characteristics which prevail at times other than when the steady state is in effect in the conventional circuitry devoid of the resistor 25 and changeover switch 31 (i.e. as when the motor is started, the reference velocity or reference phase are changed, etc., namely when the capacitor is short-circuited). In FIGS. 6a, 6b, $f_3$ represents the 0 dB crosslinking frequency, $A_3$ the DC gain, and $f_3'$ the $-3$ dB bandwidth for the closed loop.

In FIGS. 4a through 6b, the relations $A_1 \approx A_2 >> A_3$, $f_1 \approx f_2 >> f_3$ and $f_1' \approx f_2' >> f_3'$ hold. In other words, in the circuitry illustrated in FIG. 1, the frequency bands ($f_2$, $f_2'$) and gain ($A_2$) when the motor is started, etc., are approximately equal to the frequency bands and gain ($f_1$, $f_1'$, $A_1$) in the steady state. It will be understood that this is far superior to the frequency bands and gain ($f_3$, $f_3'$, $A_3$) in the prior art.

The $-3$ dB bandwidth in the case of the closed loop represents response frequency. This means that the wider the band, the quicker the start. When the DC gain is low, certain disadvantages arise. For example, the motor will not start. Also, the maximum current fails to flow, so that motor start-up is exceedingly slow.

In the embodiment shown in FIG. 1, an arrangement can be adopted in which, rather than providing the steady velocity sensing circuit 18, the CPU of the system control circuit 10 is made to judge the output of the rotational velocity error sensing circuit 15, with the changeover switches 31, 32 being controlled in accordance with the results of the decision rendered by the CPU. Though the rotational phase signal PG is sensed by the phase sensor 3 in FIG. 1, it is permissible to adopt an arrangement in which the rotational phase error is sensed by using the signal from the frequency generator 12 or a signal obtained by frequency-dividing this signal.

The rotational velocity error sensing circuit 15 and the rotational phase error sensing circuit 16 can be constructed using digital circuits. In such case, the steady velocity sensing circuit 18 would also be a digital circuit, such as a circuit including a counter. In another option, the rotational velocity error sensing circuit 15 can be left as an analog circuit, the output signal thereof subjected to an A/D conversion and the steady velocity state sensed based on the resulting digital quantity.

Figure 7A:
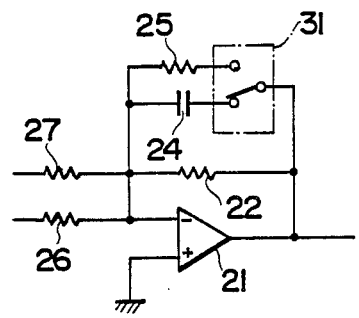
FIGS. 7a, 7b, 7c are circit diagrams illustrating respective modifications of a phase compensating circuit.
Figure 7B:
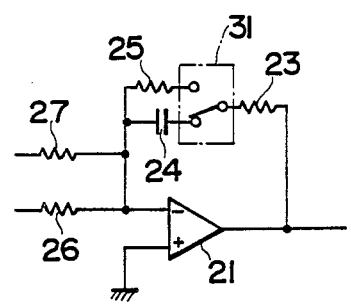
Figure 7C:
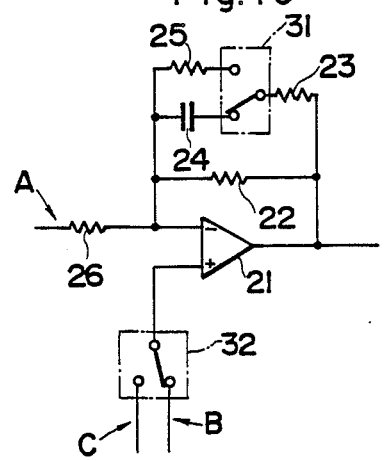

FIGS. 7a, 7b and 7c illustrate other examples of the phase compensating circuit, in which FIG. 7a shows an arrangement from which the resistor 23 has been omitted, and FIG. 7b illustrates an arrangement from which the resistor 22 has been omitted. In the arrangement of FIG. 7c, the rotational velocity error signal A is applied to one input terminal of the operational amplifier 21, and the output (signal B or C) of the changeover switch 32 is applied to the other input terminal of amplifier 21.

Though rotational velocity and rotational phase are controlled in FIG. 1, it can be so arranged that only rotational velocity is controlled, this being accomplished by deleting the circuits (3, 14, 16, 17, 32) related to rotational phase control.

Figure 8:
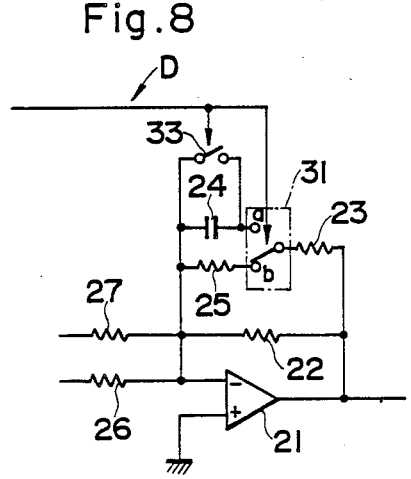
FIG. 8 is a circuit diagram showing yet another examples of a phase compensating circuit.

As shown in FIG. 8, it is possible to adopt an arrangement in which the phase compensating circuit 20 is provided with a switch 33 for short-circuiting the capacitor 24, the switch 33 being closed when the steady velocity state detection signal D attains the L level. For example, this circuit operates as follows when the reference velocity and reference phase are changed. First, when the reference phase changes while the steady state is prevailing, a large phase error detection signal B is outputted, in response to which the capacitor 24 is charged. Nevertheless, owing to the ensuing change in reference velocity, the steady velocity state detection signal D attains the L level. As a result, the changeover switch 31 is changed over from the a side to the b side. In concurrence with this, the switch 33 closes, thereby discharging the capacitor 24.

Accordingly, when the rotational velocity of the motor enters the steady velocity range and the changeover switch is changed over from the b side to the a side, there is no DC charge in the capacitor 24. Therefore, the rotational velocity will not depart from the steady velocity range and rapid pull-in of the phase system can be achieved.

As many apparently widely different embodiments of the present invention can be made without departing from the spirit and scope thereof, it is to be understood that the invention is not limited to the specific embodiments thereof except as defined in the appended claims.

What is claimed is:

1. A motor servo circuit comprising:
   a rotational velocity sensor for sensing the rotational velocity of a motor;
   a velocity error sensing circuit for sensing a rotational velocity error by comparing the sensed rotational velocity with a prescribed reference velocity;
   a phase compensating circuit, which includes a capacitor, for controlling a motor driver circuit based on the velocity error signal inputted thereto;
   steady velocity sensing means for sensing a steady velocity state in which the sensed rotational velocity is in the vicinity of the reference velocity;
   a resistance circuit connected in parallel with said capacitor; and
   changeover means for selectively connecting one of said capacitor and said resistance circuit into said phase compensation circuit in such a manner that said capacitor is connected to said phase compensating circuit only when a steady velocity state is sensed by said steady velocity sensing means, and said resistance circuit is connected to said phase compensating circuit at all other times.

2. The motor servo circuit according to claim 1, further comprising:
   rotational phase sensing means for sensing the rotational phase of the motor;
   rotational phase error sensing means which compares the sensed rotational phase and a prescribed reference phase for sensing the difference between these two phases; and
   arithmetic means for adding or subtracting the sensed rotational phase error and the rotational velocity error and applying the result to said phase compensating circuit.

3. A motor servo circuit comprising:
   a rotational velocity sensor for sensing the rotational velocity of a motor;
   a velocity error sensing circuit for sensing a rotational velocity error by comparing the sensed rotational velocity with a prescribed reference velocity;
   a phase compensating circuit which includes a capacitor, for controlling a motor driver circuit based on the velocity error signal inputted thereto;
   steady velocity sensing means for sensing a steady velocity state in which the sensed rotational velocity is in the vicinity of the reference velocity;
   a resistance circuit connected in parallel with said capacitor;
   changeover means for changing over between said capacitor and said resistance circuit in such a manner that said capacitor is connected to said phase compensating circuit when a steady velocity state is sensed by said steady velocity sensing means, and said resistance circuit is connected to said phase compensating circuit at all other times;
   a constant bias circuit for outputting a bias signal representing a constant phase error inclusive of a zero phase error; and
   second changeover means for changing over between said rotational phase error sensing means and said constant bias circuit in such a manner that a rotational phase error signal outputted by said rotational phase error sensing means is connected to said arithmetic means when a steady velocity state is sensed by said steady velocity sensing means, and the bias signal from said constant bias circuit is connected to said arithmetic means at all other times.

4. The motor servo circuit according to claim 1, further comprising switching means for short-circuiting both ends of said capacitor when a steady velocity state is not sensed by said steady velocity sensing means.

5. The motor servo circuit according to claim 3, further comprising:
   rotational phase sensing means for sensing the rotational phase of the motor;
   rotational phase error sensing means which compares the sensed rotational phase and a prescribed reference phase for sensing the difference between thee two phases; and
   arithmetic means for adding or subtracting the sensed rotational phase error and the rotational velocity error and applying the result to said phase compensating circuit.

* * * * *